US008781087B2

(12) United States Patent
Pierce et al.

(10) Patent No.: US 8,781,087 B2
(45) **Date of Patent: *Jul. 15, 2014**

(54) SIMULTANEOUS VOICE AND DATA SYSTEMS FOR SECURE CATALOG ORDERS

(75) Inventors: Jeffrey D. Pierce, Sandy Hook, CT (US); G. Jonathan Wolfman, Southbury, CT (US); Luu T. Pham, Trumbull, CT (US); Thomas J. Foth, Trumbull, CT (US); George M. Macdonald, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 208 days.

This patent is subject to a terminal disclaimer.

(21) Appl. No.: 13/423,383

(22) Filed: Mar. 19, 2012

(65) Prior Publication Data

US 2012/0179470 A1 Jul. 12, 2012

Related U.S. Application Data

(63) Continuation of application No. 11/645,980, filed on Dec. 27, 2006, now Pat. No. 8,139,733.

(51) Int. Cl.
*H04M 11/00* (2006.01)

(52) U.S. Cl.
USPC ................. 379/93.09; 379/102.01; 379/93.02

(58) Field of Classification Search
USPC .................. 379/93.09, 102.01, 93.02, 93.12, 379/102.02
See application file for complete search history.

(56) References Cited

U.S. PATENT DOCUMENTS

| | | | | |
|---|---|---|---|---|
| 6,665,085 | B1 | 12/2003 | Edmunds et al. | |
| 8,139,733 | B2 * | 3/2012 | Pierce et al. | 379/93.09 |
| 2004/0003256 | A1 | 1/2004 | Coffy et al. | |
| 2005/0031099 | A1 | 2/2005 | Iggulden et al. | |
| 2005/0171915 | A1 | 8/2005 | Fearnley et al. | |
| 2006/0259444 | A1 | 11/2006 | Obrea et al. | |

FOREIGN PATENT DOCUMENTS

| | | | |
|---|---|---|---|
| EP | 0475776 | A2 | 9/1991 |
| EP | 0889442 | A2 | 1/1999 |
| EP | GB2401578 | A | 11/2004 |

* cited by examiner

*Primary Examiner* — Stella Woo
(74) *Attorney, Agent, or Firm* — Brian A. Lemm; Charles R. Malandra, Jr.; Steven J. Shapiro

(57) ABSTRACT

Systems and methods for providing a simultaneous voice and data user interface for secure catalog orders and in particular for providing a system and method for providing a distributed voice user interface for a remote device having a limited visual user interface simultaneously with a data stream for facilitating secure automated catalog orders for simultaneous electronic fulfillment applied to that device are described.

20 Claims, 5 Drawing Sheets

SIMULTANEOUS VOICE AND DATA SYSTEMS FOR SECURE CATALOG ORDERS

CROSS-REFERENCE TO RELATED APPLICATION

This application is a Continuation Application of patent application Ser. No. 11/645,980, filed Dec. 27, 2006, now U.S. Pat. No. 8,139,733, which application is incorporated herein by reference in its entirety. This application is related to application Ser. No. 11/172,182, entitled "Control Panel Label For A Postage Printing Device" and filed Jun. 30, 2005, which related application is incorporated herein by reference.

FIELD OF THE INVENTION

The present invention relates to a system and method for providing a simultaneous voice and data system for secure catalog orders and more particularly in certain embodiments to a system and method for providing a distributed voice user interface for a remote device having a limited visual user interface simultaneously with a data stream for facilitating secure automated catalog orders for simultaneous electronic fulfillment applied to that device.

BACKGROUND

Mailing machines including postage metering systems are known in the art including the DM SERIES of mailing machines available from Pitney Bowes Inc. of Stamford, Conn. Additionally, Internet based postage delivery systems and data center services are also available from Pitney Bowes Inc. A postage metering system applies evidence of postage, commonly referred to as postal indicia, to an envelope or other mailpiece (directly or on a label to be applied thereto) and accounts for the value of the postage dispensed. A mailing machine including a closed system postage meter typically includes a dedicated printer securely coupled to a Postal Security Device PSD postage vault. The PSD postage vault is typically a physically secure device.

A method and system for dispensing virtual stamps is described in U.S. Patent Application Publication US 2003/0074325 A1 entitled Method and System for dispensing Virtual Stamps by Ryan that was published on Apr. 17, 2003 (the Ryan '325 Application) and that is incorporated herein by reference. A Virtual Stamp Dispensing Metering VSDM system is described wherein indicia of varying values are calculated at a remote data center and downloaded to a mailing machine. The VSDM system stores the indicia and dispenses the indicia as needed. The user orders pre-computed postage tokens or Units of Information of Value UIVs that are downloaded to the VSDM. The VSDM system includes a secure storage unit for storing state data such as a state indicator that is used to prevent fraudulent reuse of the virtual stamps. A status field for each indicium record, i.e., Issued or Unused, is maintained to indicate whether an indicium has been issued (printed) or not. Traditional mailing machines and postage meters include a robust user interface with a comprehensive LCD or LED information display and keypad that may be relatively complex and costly. Since a VSDM may be a low-cost device, it may not be desirable to utilize a virtual stamp postage printing device with an embedded complex user interface.

Accordingly, there is a need for systems and methods for providing a remote device such as a postage printing device with an economical user interface. Additionally, there may be a need for a user interface that accommodates a regional collocated processor wherein the collocated processor with a robust user interface to control the device for modes such as setup and a remote mode for using a voice interface for ordering additional postage records.

Furthermore, there is a need for a system and method for providing a simultaneous voice and data system for secure catalog orders and more particularly in certain embodiments to a system and method for providing a distributed voice user interface for a remote device having a limited visual user interface simultaneously with a data stream for facilitating secure automated catalog orders for simultaneous electronic fulfillment applied to that device. Additionally, there may be a need for an intermediary secure interface system for providing a connection for simultaneous voice and data system for secure catalog orders. Furthermore, there may be a need for a system for simultaneous voice and data system for secure catalog orders using the business device as an authentication token.

SUMMARY

The present application describes illustrative embodiments of an invention relating to a system for providing a simultaneous voice and data user interface for secure catalog orders and in more detailed embodiments to provide a system and method for providing a distributed voice user interface for a remote device having a limited visual user interface simultaneously with a data stream for facilitating secure automated catalog orders for simultaneous electronic fulfillment applied to that device.

In additional illustrative embodiments, an intermediary secure interface system is described for providing a connection for simultaneous voice and data system for secure catalog orders for use with a remote device. In further embodiments, the system uses the intermediary device or the remote device as an authentication token.

In further additional embodiments, systems and methods for providing a remote device distributed user interface is provided having a user interface that accommodates a regional collocated processor wherein the collocated processor includes a robust user interface to control the device for complex modes of operation such as setup and a remote mode for using a voice interface for less complex interaction modes including ordering additional postage records.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

Figure 1:
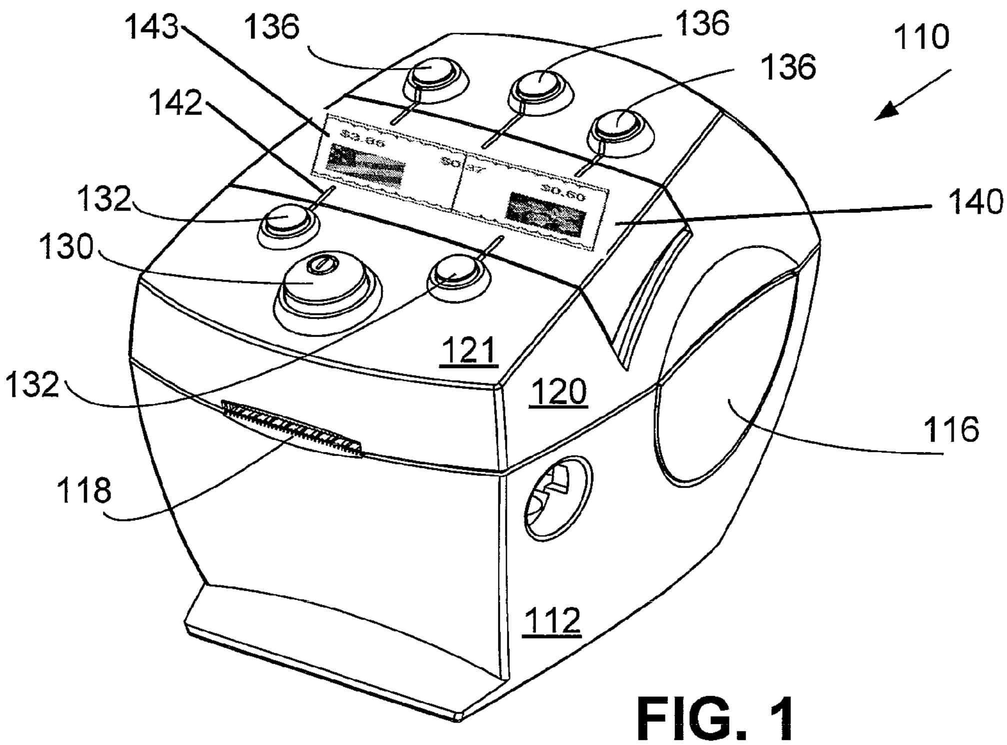
FIG. 1 is a perspective view of a virtual stamp printer according to an illustrative embodiment of a postage evidencing system according to an illustrative embodiment of the present application.

The illustrative embodiments of the present application describe systems and methods for providing a simultaneous voice and data user interface for secure catalog orders and in more detailed embodiments to provide a system and method for providing a distributed voice user interface for a remote device having a limited visual user interface simultaneously with a data stream for facilitating secure automated catalog orders for simultaneous electronic fulfillment applied to that device.

In additional illustrative embodiments, an intermediary secure interface system is described for providing a connection for simultaneous voice and data system for secure catalog orders for use with a remote device. The voice or data mode may be suspended while the other mode is active in certain implementations. In further embodiments, the system uses the intermediary device or the remote device as an authentication token. In further additional embodiments, systems and methods for providing a remote device distributed user interface is provided having a user interface that accommodates a regional collocated processor wherein the collocated processor includes a robust user interface to control the device for complex modes of operation such as setup and a remote mode for using a voice interface for less complex interaction modes including ordering additional postage records In the illustrative embodiments described, the remote device with limited visual user interface is a Virtual Stamp Dispensing Metering (VSDM) printer system including a stand alone thermal label printer capable of printing custom virtual stamps, including IBI indicia and images in variable denominations with user defined custom graphic images that are associated with the individual virtual stamps at the time of printing. The methods and systems described may be advantageously utilized with other remote devices such as business devices with a limited visual user interface.

Voice terminals such as analog handsets are commonly available even in developing countries. Accordingly, in providing a simultaneous voice and data connection, an inexpensive user interface may be provided. Voice Response Units VRUs are commercially available and may be used in conjunction with a central data center for processing voice information. Since a simultaneous data and voice link is provided, Such systems may utilize information systems standards such as Voice XML that may be used to provide interactive voice response sessions that are dictated by factors such as the device ID, user ID, device type, prior user or device history data and/or current state data as described herein. Certain systems have been described for providing a distributed voice user interface for control of a device such as a PDA or stereo including those described in U.S. Pat. No. 6,408,272 B1, issued Jun. 18, 2002 to White, et al., entitled "Distributed Voice User Interface."

In one embodiment, the system includes a data center server computer system, such as a Voice Response Unit (VRU), VoiceXML or other programmable system with telephone interface, and a small intermediary device that connects the controlled device to the telephone line. The intermediary device is pre-programmed to dial a telephone number associated with the Data Center Server. Once the small intermediary device connects to the remote system, the remote system polls the connected device for its current state. Once the remote system has acquired the connected device's current state, the small device indicates to the user (through an LED) that the user may use the telephone handset to communicate with the remote data center system. Once the voice selections have been made, the user hangs up the handset and the controlling data center system communicates to the device the setup and control instructions or the purchased items.

The system is useful where there are many customers/users with devices that can not, or do not want to, connect to a local computer. To connect the device to the central computer system, the customer purchases an optional interface hub component that hooks their device to a telephone. The interface hub may support multiple distinct devices and may be configured to call a distinct data center server telephone number depending upon the device connected to the hub. To use the system, the customer connects their device to the hub and the hub to the telephone. The user calls the central computer system or the hub is preprogrammed to call a specific number. Once the central computer system answers the call, it uses the hub to interrogate the device for the ID of the device and other relevant data. In the case of a potage printer such as the VSDM, this might include how many indicia tokens remain on the device and in which denominations as well as which custom postage images have been downloaded.

The hub then indicates to the user that they may proceed with a conversation with the central system using the handset. The user, in conversation with the remote data center system, may elect to have certain aspects of the device reprogrammed by the central system. The user may elect to order postage tokens or custom images for electronic delivery to the VSDM. To provide additional security, the central system might prompt the user for a PIN to verify that the authorized user is placing the phone call. In alternatives described herein, the VSDM or interface device may provide authentication information to the central data center server computer. Requests for actions to be performed on their device may be made either by pressing numbers on the key pad or speaking instructions. Once the instructions have been received from the customer, the hub may disconnect the phone from the telephone line using a relay to suspend or end the voice portion of the call allowing the customer to hang up the telephone handset. The central computer then continues to communicate with the hub by packing the messages into a form understandable by the hub and modulating the packet for transmission. The hub demodulates and unpacks the messages, then transmits them to the device via the USB port of the device. The hub packs any responses from the device and modulates, then sends them to the central computer. Once the instructions have been successfully transmitted, the hub terminates the connection to the central computer and indicates success to the user. If there is an error in transmission, the component indicates a failure and the customer can pick up the phone and hear reasons for and instructions regarding the failure.

In traditional mailing machines with postage meters, users were able to utilize systems such as INTELLILINK available from Pitney Bowes Inc. of Stamford Conn. to use the robust user interface of the mailing machine to download postage funds to the postage meter. The postage funds are not typically assigned to particular postal tokens but rather increase the amount of postage stored in the postage meter for dispensing when needed in denominations as needed. In earlier systems, users could utilize the POSTAGE-BY-PHONE system available from Pitney Bowes Inc. of Stamford Conn. to effectuate postage refill by obtaining a refill code for input to the postage meter by making a telephone call. Simultaneous Voice and Data (SVD) systems are available from vendors including AT&T of San Antonio, Tex. Such systems may utilize the V.61 and V.34Q ITU SVD standards as specified by the International Telecommunications Union.

Referring to FIG. 1, a perspective view of a virtual stamp printer 110 according to an illustrative embodiment of a postage evidencing system according to an illustrative embodiment of the present application is shown. FIG. 1 shows portions of a virtual stamp dispensing meter 110 including a thermal printer and secure indicia accounting mechanism to keep track of printed virtual stamps. The user interface includes several lighted buttons and a window to accept printed labels to associate actions with the buttons. The VSDM 110 may include a physically secure coprocessor such as an iButton cryptographic device available from Dallas Semiconductor of Dallas, Tex. to provide end-to-end security with a Data Center including authentication, non-repudiation and secure encrypted communication.

The VSDM printer 110 includes a lower clamshell printer assembly 112 and an upper clamshell assembly 120. The upper clamshell assembly 120 includes a control panel portion 121. The clamshell portions close on a thermal media printer output port and serrated label cutting edge 118. The lower assembly 112 includes a translucent thermal media bay window 116. The control panel portion 121 includes a hinged translucent control panel label cover window 140 that includes several control panel markers 142 to pint to a printed label control panel label 143. The control panel portion 121 includes six buttons/LED indicators including a row of three denomination selection buttons/LED indicators 136, a row of two custom graphic selection buttons/LED indicators 132 and a print/power button/LED indicator 130. The print/power button includes a multi-color LED used to provide indications such as a flashing blue state to indicate connection to a data center. As described more fully below, in operation in a first user interface mode, a collocated processor is utilized to provide a robust visual user interface while in a second user interface mode, a distributed voice communication system is utilized.

Figure 2:
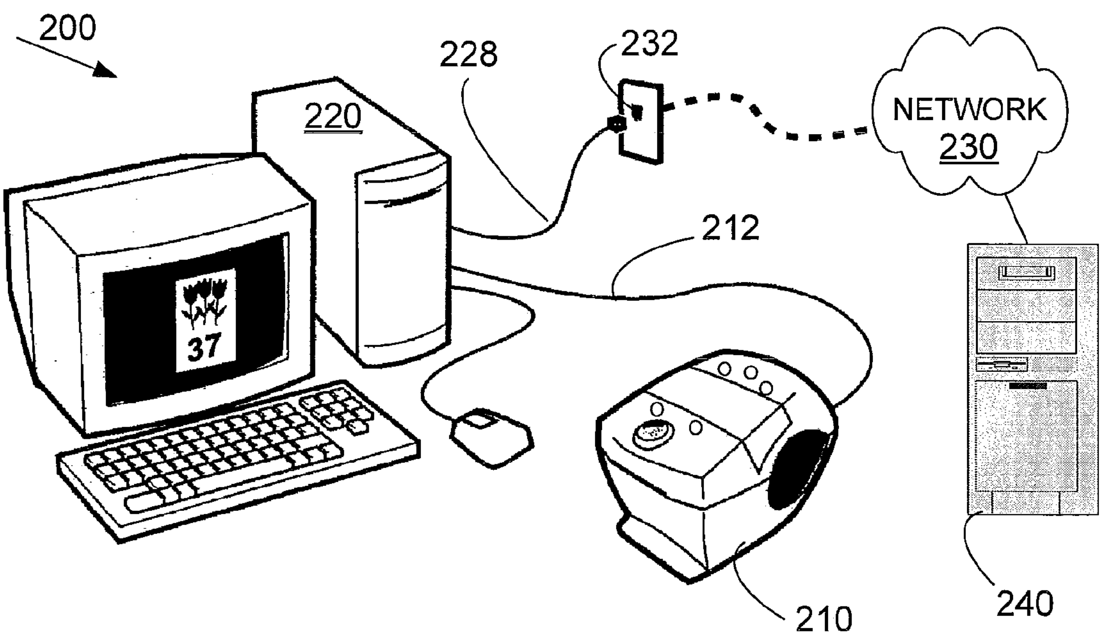
FIG. 2 is a schematic of a virtual stamp dispensing metering system including a virtual stamp printer system, a regional collocated processor and a central data server according to an illustrative embodiment of a postage evidencing and replenishment system according to the present application.

Referring to FIG. 2, a schematic of a virtual stamp dispensing metering system 200 including a virtual stamp printer system 210, a regional collocated processor 220 and a central data server 240 according to an illustrative embodiment of a postage evidencing and replenishment system according to the present application is shown. System 200 including a collocated personal computer processor PC 220 according to an illustrative embodiment of a postage evidencing system according to the present application is shown. A virtual stamp, as used herein, provides evidence of postage paid using a thermal media label that is similar to a conventional adhesive stamp. In developing countries, there may not be widespread ownership of personal computers. However, there may be access to shared regional computers. Accordingly, there is a need to provide a very low cost user interface that utilizes shared regional computers with robust interfaces remote distributed voice interfaces. The shared computer 220 is connected to the data center 240 through network 230 using connection elements 228 and 232. The network 230 may include the Internet. The communication link 228, 232 comprise an Ethernet connection to the Internet, but could alternatively utilize a telephone connection via a Public Switched Telephone Network (PSTN) or a local network connection via a Local Area Network (LAN). The VSDM 210 is connected to the PC 220 using USB serial connection 212. The internal VSDM user interface is limited to several lighted buttons and a printed control panel as described above.

The VSDM user interface is distributed using at least one limited internal user interface and at least two external user interfaces. The external user interfaces include a first external user interface having a shared computer 220 with a robust user interface and a second external user interface having a distributed voice system using the limited visual user interface of the VSDM 210. A computer such as a regional computer 220 with a robust user interface is utilized to provide the first external user interface and to process a certain first set of non-secure user interface needs such as transactions that do not involve financial transactions. For example, the user may process a setup sequence using the shared computer 220. The user may insert a name and address or similar setup information in a first set of transactions advantageously using a more robust user interface. Thereafter, the VSDM 210 uses the second external user interface using a low cost telephone or other voice/data connection to process a second set of transactions such as financial transactions using a voice user interface with the data center 240. In an alternative, the sets of transactions provided in using the two user interface modes may overlap as appropriate. In another alternative, the computer 220 need not be connected to the Data Center 240 to process certain transactions. In an alternative, the regional computer is instead a local private computer that is not always connected to the device. Additionally, in another alternative, any setup is performed by the manufacturer or distributor and programmed into the VSDM memory or the setup may be preformed using the distributed voice interfaces described herein.

Data center 240 includes a suitable processing system having a computing device such as a server computer and one or more memory components for data storage. The data center 240 also includes Voice Response Unit and a Virtual Indicia system including a cryptographic subsystem and a virtual PSD record storage system that are in operative communications with the server. In an alternative embodiment, the VSDM is replaced with a more generic device as a local Unit of Information of Value UIV processing system for processing other UIVs such as music files, video files, multimedia content UIVs or event tickets. The first user interface may include a heavy client browser based application in communication with the Data Center and with the VSDM through a USB interface providing a robust visual display and keyboard/mouse interface. The second user interface may include a voice and data connection to the Data Center that includes a Voice Response Unit processor in communication with the VSDM to provide a voice based user interface with limited visual and/or audio indications available through the VSDM.

The application running on collocated processor 220 provides a robust user interface to the VSDM 210 when the VSDM is connected to the collocated PC 220. For example, the main function buttons 320 include the function print postage. Accordingly, when the VSDM 210 is connected to the collocated processor 220, the user does not need to use the VSDM buttons to operate the device. The user operates the device through the robust user interface program 300 such as through interactive window 310. The robust user interface 220 provides a printer status function and allows complex interactions with the Data Center using a computer display, mouse and keyboard. The robust user interface displays the postage available in the VSDM 210. The user may select a postage token of a particular value to be printed. Similarly, the user may select a custom or stock image from the stamp art collection stored on the collocated PC 220 using section 340 of the user interface. The user may then print the generated virtual stamp.

Figure 3:
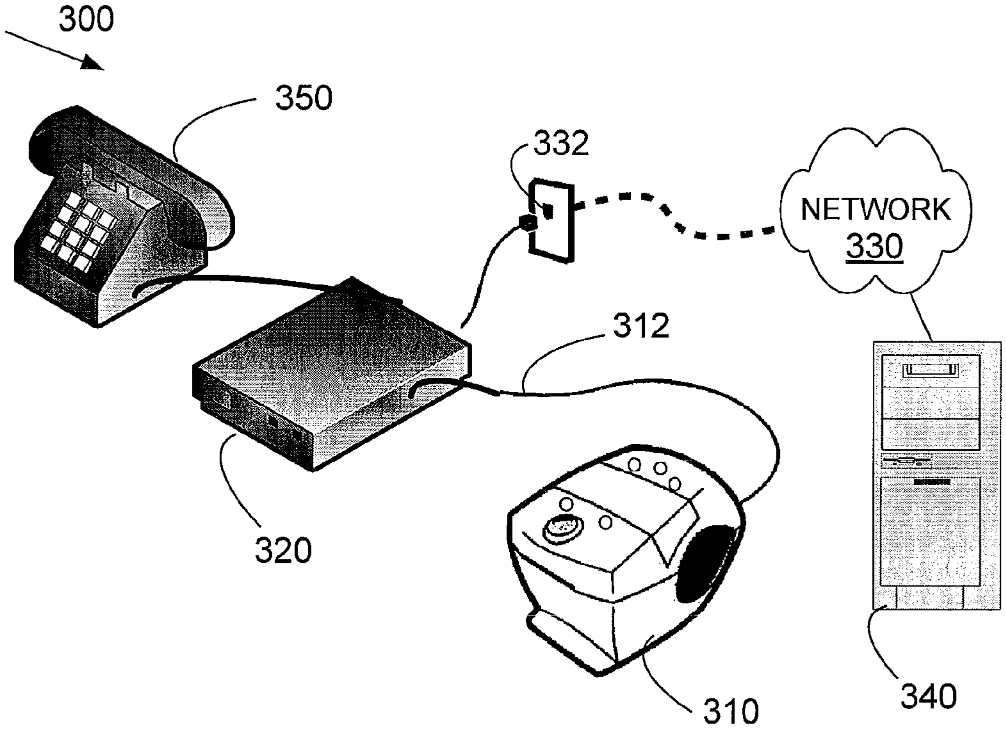
FIG. 3 is a schematic of a virtual stamp dispensing metering system including a virtual stamp printer system, an intermediary device, a voice terminal and a central data server according to another illustrative embodiment of a postage evidencing and replenishment system according to the present application.

Referring to FIG. 3, a schematic of a virtual stamp dispensing metering system 300 including a virtual stamp printer system 310, an intermediary device 320, a voice terminal 350 and a central data server 340 according to another illustrative embodiment of a postage evidencing and replenishment system according to the present application is shown. The intermediary device 320 is connected to VSDM 310 using a USB connection 312 or other appropriate connection and it is connected to the Data Center server 340 through Network 330 using connection 332. The VSDM 310 may send an initiate connection message to the intermediary device 320 upon receiving certain keystrokes from the user. The intermediary device 320 may be programmed to call a particular telephone number or the user may dial the number entered using the telephone handset 350.

The network may include an analog circuit switched network, a digital packet switched network or other suitable network. An analog telephone handset 350 is connected to the intermediary device 320. The intermediary device 320 includes a USB controller and modem system for providing a simultaneous voice and data connection to the data Center server 340. In an alternative, the telephone handset may be incorporated into the intermediary device and in yet another alternative the intermediary device may be incorporated into the VSDM.

Figure 4:
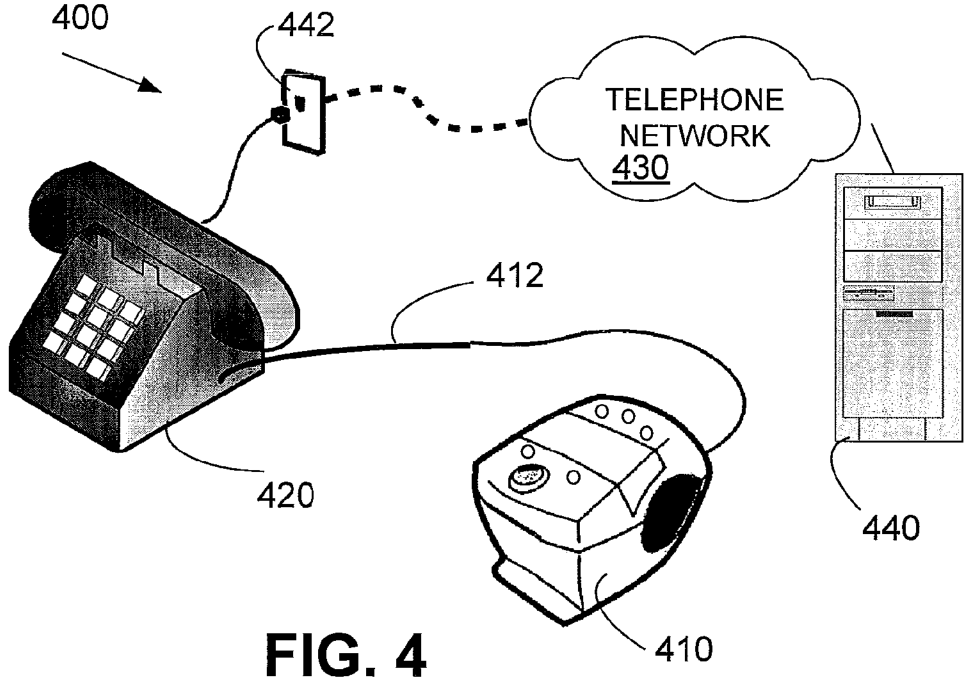
FIG. 4 is a schematic of a virtual stamp dispensing metering system including a virtual stamp printer system, an integrated voice and data terminal and a central data server according to another illustrative embodiment of a postage evidencing and replenishment system according to the present application.

Referring to FIG. 4, a schematic of a virtual stamp dispensing metering system 400 including a virtual stamp printer system 410, an integrated voice and data terminal 420 and a central data server 440 according to another illustrative embodiment of a postage evidencing and replenishment system according to the present application is shown. The integrated voice and data terminal 420 is connected to VSDM 410 using a USB connection 412 and it is connected to the Data Center server 440 through Network 430 using connection 442. The network may include an analog PSTN circuit switched network. The VSDM 410 may include a physically secure coprocessor such as an iButton cryptographic device available from Dallas Semiconductor of Dallas, Tex. to provide end-to-end security with the Data Center 440 including authentication, non-repudiation and secure encrypted communication.

Figure 5:
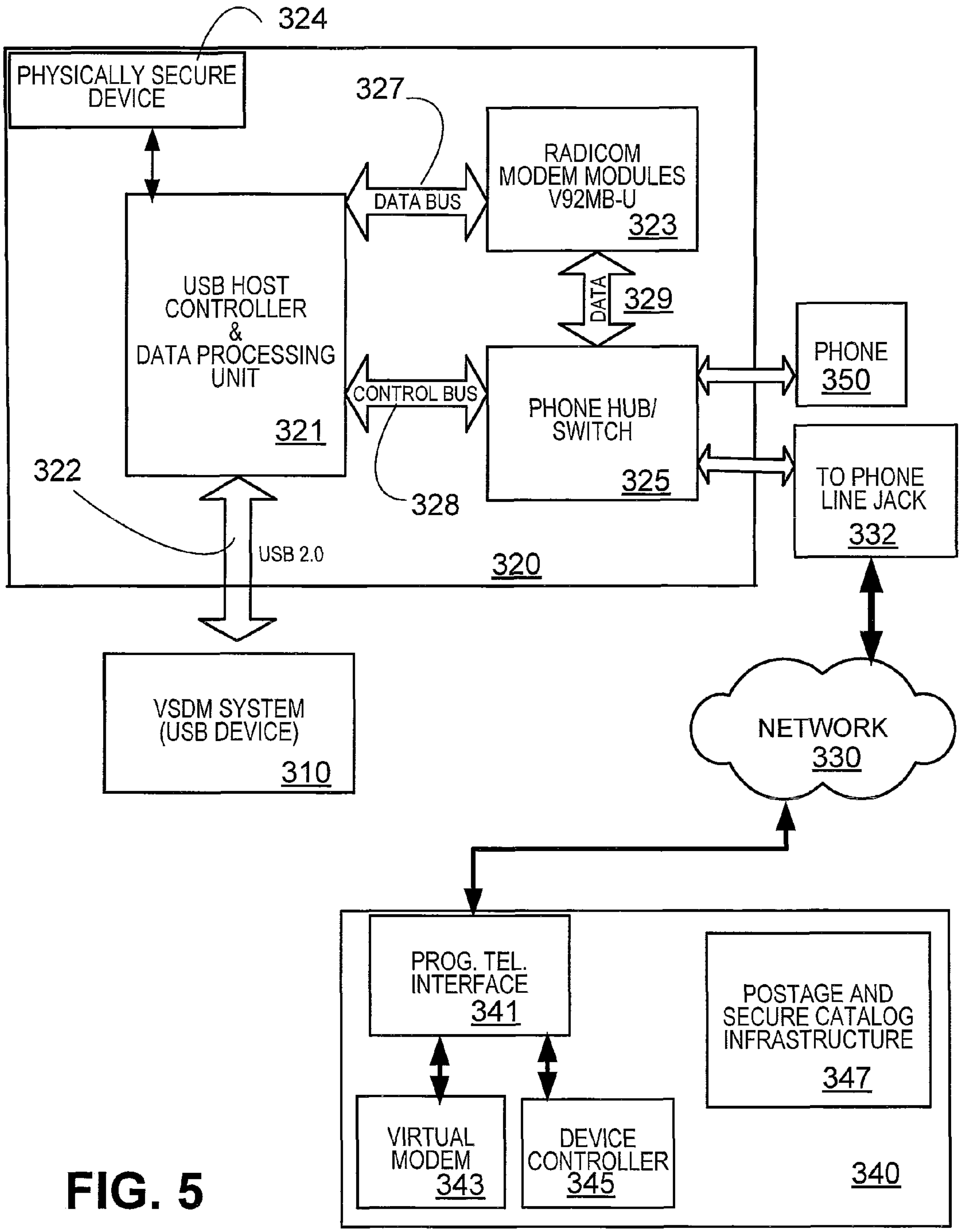
FIG. 5 is a schematic diagram of the system of FIG. 3.

Referring to FIG. 5, a schematic diagram of the illustrative system of FIG. 3 is shown. In this configuration, a standalone intermediary device is provided for establishing the voice/data connection. Here, multiple distinct USB device types may be supported including VSDMs and other devices with limited user interfaces. The Data Center Server 340 is connected to Network 330 such as the PSTN. Alternatively, other networks may be used. The Server 340 includes a network interface such as a voice modem bank 341. The server 340 includes a Voice Response Unit VRU to provide the VRU functions and any distributed voice user interface functions described herein. A virtual modem system 343 is provided and a system for providing the logic to control the VSDM 345 is provided. For each USB device supported, another logic device controller can be provided. The system also includes the backend postage and catalog infrastructure 347. The postage accounts for each user are maintained and orders processed through the system 347. As can be appreciated, the separate functions described in Server 340 may reside in separate computers at the Data Center.

The VSDM 310 is described above and includes an interface such as the USB interface. It includes a controller and a rudimentary user interface including several lighted buttons and a printed control panel. The Intermediary Device 320 provides voice/data interface capability to devices having limited user interface capability such as the VSDM. The Intermediary Device 320 includes a USB 2 interface 322 or other external interface. It includes a Controller and Processor 321 for hosting the USB connection from the VSDM and for controlling the internal voice/data modem 323. The Intermediary device 320 includes at least one control bus 328 and two data buses 327, 329. In this illustrative embodiment, the external lines to handset 350 and jack 332 are analog lines and the switch 325 is an analog switch with data bus 329 including an analog bus. The controller 321 operates the internal voice/data modem 323 that is connected through switch 325 to an analog telephone handset 350 and an analog jack for the data connection using the analog telephone line digital modem. Alternatively, a handset with a jack may be utilized or a digital voice terminal may instead be utilized. As an alternative, a Voice over IP (VOIP) system may be employed for voice/data connections herein instead of analog modem voice/data connections.

The Controller 321 also controls a phone hub/switch 325 that coordinates access to the telephone line 332. Alternatively, the telephone modem subsystem may be replaced by the SVD solution systems commercially available. In this illustrative embodiment, the Intermediary Device also includes a physically secure device 324 including the Dallas iButton cryptographic coprocessor. The iButton is physically secure against tampering and is used to provide cryptographic functions for authentication, non-repudiation and cryptographic securing of information transferred to the Data Center 340. The Intermediary Device 320 may be used with several different end systems such as the VSDMs and provide cryptographic security across a class of devices in an economical solution providing increased remote user interface capability.

The virtual stamps described herein include digital tokens generated at the Data Center that are downloaded to a specific VSDM for printing as the virtual stamps are needed. In the first user interface connection described with reference to a collocated computer, the computer may provide cryptographic security using its browser system and certificates. Here, the relatively less complicated Intermediary Device 320 can provide cryptographic security and network accessibility using an inexpensive analog PSTN telecommunications network.

Figure 6:
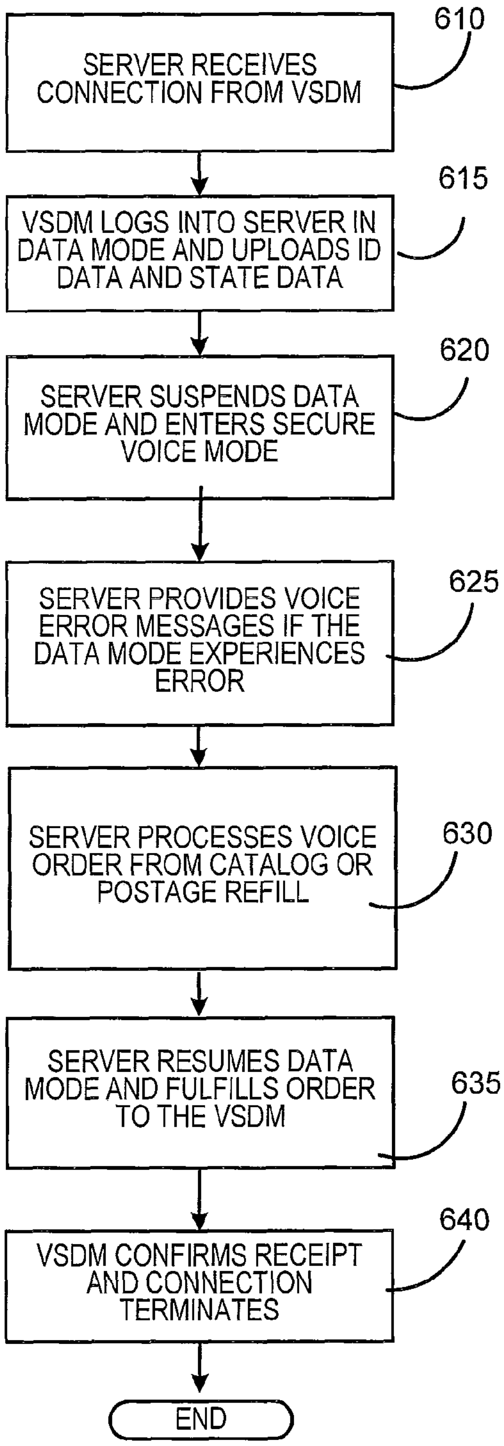
FIG. 6 is a flow chart describing a process for using a distributed voice user interface for a remote device having a limited visual user interface simultaneously with a data stream for facilitating secure automated catalog orders for simultaneous electronic fulfillment applied to that device according to an illustrative embodiment of the present application.

Referring to FIG. 6, a flow chart describing a process for using a distributed voice user interface for a remote device having a limited visual user interface simultaneously with a data stream for facilitating secure automated catalog orders for simultaneous electronic fulfillment applied to that device according to an illustrative embodiment of the present application is shown. In step 610, the data Center server receives a connection from a particular VSDM. In step 615, the VSDM logs into the server in a data mode and uploads ID data and state data associated with the VSDM. Since the VSDM may have been dispensing virtual stamps since its last connection with the Data Center, the state data at the Data Center will be updated. In this illustrative embodiment, the server then suspends the data mode and enters the secure voice mode. In an alternative, the voice mode is not secured. In step 625, the Server provides any required voice error messages based upon the data mode exchange or other stored error messages that were queued to send to that VSDM at next contact. For example, if the user account is delinquent, the user is informed that no purchases will be allowed.

In step 630, the Server processes a voice order from a catalog or a postage refill. For example, the user may be prompted by the VRU of Data Center 340 whether the user would like to buy 20 virtual one ounce first class stamp tokens. The Server voice prompts may be based upon a custom menu developed for that VSDM based upon current state data, history data or preference data. For example, if the user has fewer first class stamps than priority mail stamps, that denomination is offered. Alternatively, a standard voice prompt menu may be provided to the user including offers to buy virtual stamps or custom stamp images from a category of images. Once the Server VRU processes the order for one virtual book of 20 virtual first class stamp tokens, the VRU suspends or terminates the voice portion of the connection. In step 635, the Server resumes the data mode and fulfills the order by sending the digital tokens to the VSDM for later printing. In step 640, the VSDM confirms receipt of the digital stamp tokens and the connection is terminated and the process ends. The steps described herein may be rearranged as appropriate.

Figure 7:
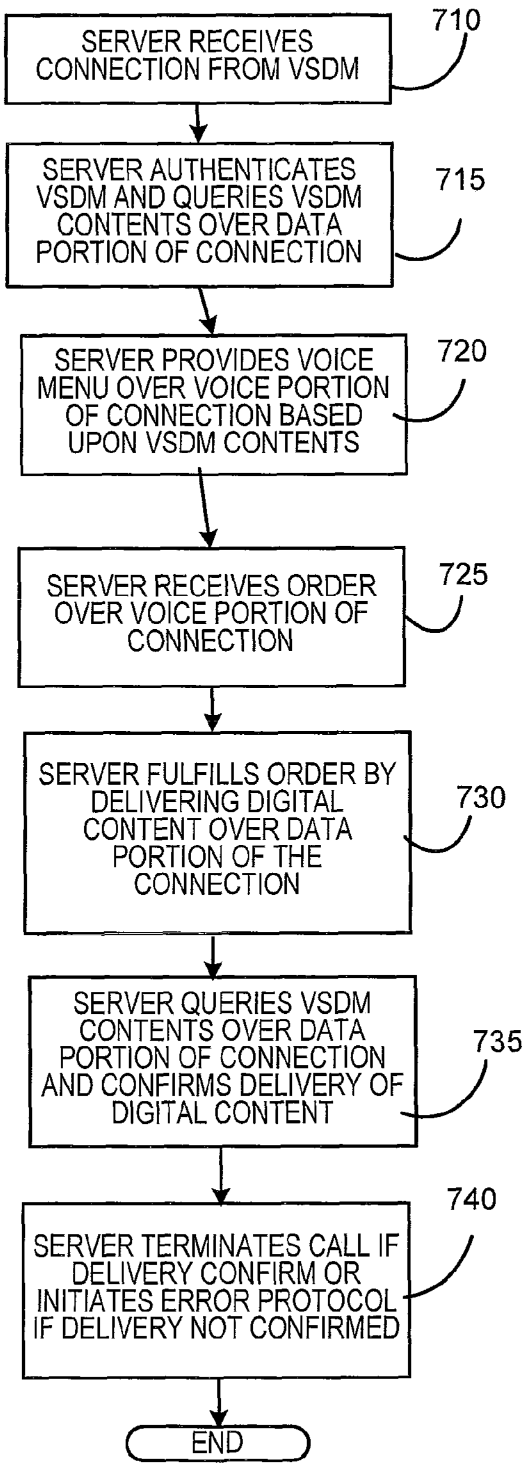
FIG. 7 is a flow chart describing a process for using a distributed voice user interface for a remote device having a limited visual user interface simultaneously with a data stream for facilitating secure automated catalog orders with device authentication for simultaneous electronic fulfillment applied to that device according to yet another illustrative embodiment of the present application.

Referring to FIG. 7, a flow chart describing a process for using a distributed voice user interface for a remote device having a limited visual user interface simultaneously with a data stream for facilitating secure automated catalog orders with device authentication for simultaneous electronic fulfillment applied to that device according to yet another illustrative embodiment of the present application is shown. In step 710, the server receives a connection from a particular VSDM such as by telephone call that is capable of voice and data support. In step 715, the server authenticates the VSDM using a secure handshake with a secure hardware coprocessor located with the VSDM. In one alternative, the secure coprocessor is located in an intermediary device used to provide the connection to the Server. The VSDM then sends data to the Server over the data portion of the connection.

In step 720, the Server 340 provides a voice menu to the user over the voice portion of the connection. VRU systems are known for programming such voice interfaces and may utilize the VoiceXML systems available. The menu may be based upon the data previously sent to the VSDM to the Data Center server. For example, if the user VSDM has few stamps remaining in a particular denomination, that denomination may be offered. In step 725, the Server receives an order over the voice portion of the connection such as an order for a book of 20 virtual first class stamps. The user account is debited. In step 730, the Server fulfills the order by delivering the virtual book of 20 digital stamp tokens over the data portion of the connection to the VSDM. In step 735, the Server queries the VSDM contents over the data portion of the connection and confirms receipt of the digital tokens or other ordered content such as digital custom postal images. In step 740, the Server terminates the call if the delivery is confirmed or initiates error protocol if the delivery is not confirmed. The process then terminates.

Figure 8:
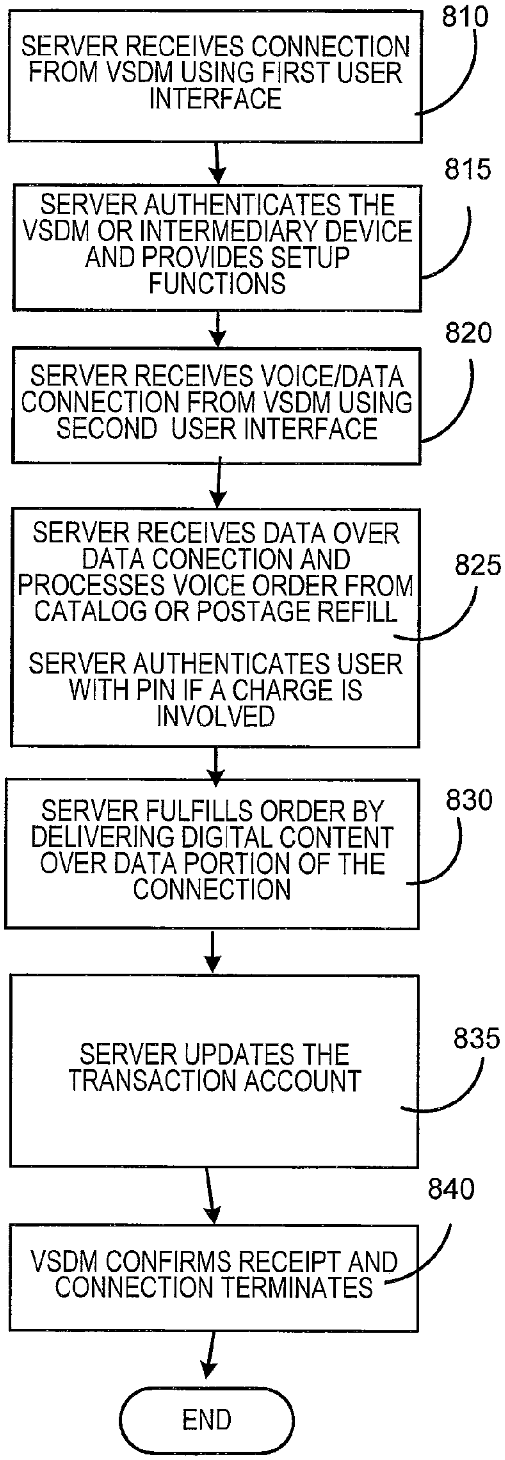
FIG. 8 is a flow chart describing a process for using a first user interface for certain functions and a second distributed voice user interface for a remote device having a limited visual user interface simultaneously with a data stream for certain functions according to yet another illustrative embodiment of the present application.

Referring to FIG. 8, a flow chart describing a process for using a first user interface for certain functions and a second distributed voice user interface for a remote device having a limited visual user interface simultaneously with a data stream for certain functions according to yet another illustrative embodiment of the present application is shown. In step 810, the Data Center Server receives a connection from the VSDM using a first user interface such as a shared collocated computer at a first remote location. The computer may include a heavy browser client for communicating with the server and for providing a user interface to control certain functions of the VSDM. The Server may also communicate end-to-end with the VSDM through a pass through connection. In step 815, the Server authenticates the VSDM or intermediary device and performs a first set of operations designed for use with the collocated shared processor such as setup functions. That transaction is completed and the user may take the VSDM to an even more remote second location having no collocated computer available.

In step 820, the Server receives a Voice/Data connection from the VSDM using a second user interface such as a primarily voice handset connection user interface with a limited visual/audio indication interface with a limited button arrangement provided by the VSDM. The VSDM or optional intermediary device may be used as a token to authenticate the connection with the Server. For example, the intermediary device may include an iButton used to cryptographically authenticate the connection. In step 825, the Server receives data over a data connection and processes a voice order from a catalog of postage refill order over the voice connection. If a charge of funds is involved in the transaction, the Server may further authenticate the user with a PIN.

In step 830, the Server fulfills the order by delivering the digital content over the data portion of the connection to the VSDM. For example, if the user ordered a book of virtual stamps, the Server would generate a book of digital stamp tokens and send them to the VSDM. In step 835, the Server updates that transaction account to reflect the transaction. In step 840, the VSDM confirms receipt of the order and the connection terminates. The process then ends.

Figure 9:
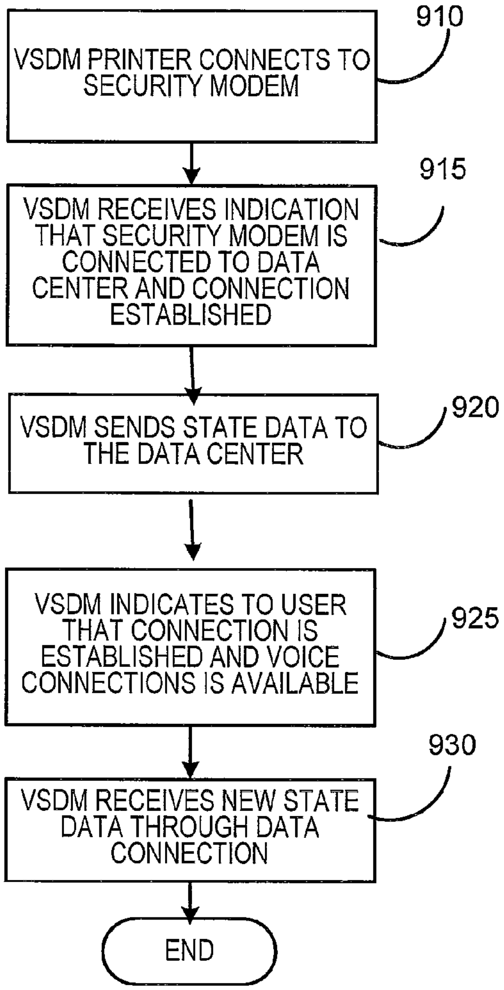
FIG. 9 is a flow chart describing a process for using a distributed voice user interface for a remote device having a limited visual user interface simultaneously with a data stream according to yet another illustrative embodiment of the present application.

Referring to FIG. 9, a flow chart describing a process for using a distributed voice user interface for a remote device having a limited visual user interface simultaneously with a data stream according to yet another illustrative embodiment of the present application is shown. In step 910, a remote device with a limited visual user interface such as a VSDM printer connects to a modem using a connection that may be secured. In the illustrative embodiment, the connection utilizes the Universal Serial Bus USB connection. In alternatives, other connections may be used or the modem is incorporated into the VSDM. The modem may be a “security modem” as described herein as including a secure coprocessor for security applications. As an alternative, a Voice over IP (VOIP) system may be employed instead of analog modem voice/data connections. In step 915, the VSDM receives an indication that the security modem is connected to the Data Center and a connection is established. In the illustrative embodiment, an end-to-end data connection is established from the VSDM through the USB connection and through the secure modem to the Data Center over a telephone connection. In alternatives, a network connection may be utilized and other security measures employed. For example, in one alternative, the Security Modem includes a physically secure token such as an iButton. The security modem may then be used to physically authenticate the session as a security token. Alternatively, other security procedures may be used and the VSDM itself may authenticate the session in an end-to-end connection. The VSDM may also include a physically secure token such as an iButton but may instead use only the VSDM serial number for identification and authentication.

In step 920, the VSDM sends state data to the data Center. Here, the state data includes information regarding the postage tokens that have been dispensed since the last connection to the Data Center. Additionally, other status or identification information may be provided. In step 925, the VSDM indicates to the user that a connection to the data Center has been established and that a voice connection is available. Here, the indication is through flashing a button LED, but could also be indicated by an audible indication. The user then uses the simultaneous voice connection to process a transaction. Here, the user utilizes a handset that is separate from the VSDM, but the handset could also be incorporated into the VSDM or incorporated into a collocated intermediate security modem. In step 930, the VSDM receives new state data through the data connection in response to the voice transaction and the process ends.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. In addition, the concepts of the present invention are not limited to application in the area of postal indicia printing, but may also be used in connection with other devices benefiting from a simultaneous voice and data user interface. Accordingly, the invention is not to be considered as limited by the foregoing description.

We claim:

1. A device for providing a simultaneous voice and data connection to at least one of a plurality of remote device types each having a limited user interface comprising:

a processor including memory and instructions configured to provide a voice user interface utilizing distributed voice user interface processing resources;

a remote device connection interface for operatively connecting a plurality of remote device types each having a limited user interface to the processor;

a simultaneous voice and data interface for operatively connecting the processor to a voice and data capable network configured to provide distributed voice user interface functions for controlling the remote devices.

2. The device of claim 1, further comprising a secure cryptographic coprocessor connected to the processor for securing the simultaneous voice and data connection.

3. The device of claim 1, wherein the remote device connection interface includes a USB connection.

4. The device of claim 1, wherein the simultaneous voice and data interface is configured to connect to an analog telephone handset.

5. The device of claim 1, wherein the simultaneous voice and data interface is configured to connect to an analog PSTN telephone network.

6. The device of claim 1, wherein the simultaneous voice and data interface further comprises a switch used for switching between a data mode and a voice mode.

7. The device of claim 1, wherein the processor is preconfigured to call a particular telephone number.

8. A device having a distributed voice user interface comprising:

a processor including memory and instructions configured to provide a user interface to a user collocated with the device utilizing distributed voice processing resources;

a first internal user interface connected to the processor;

at least one external connection operatively connected to the processor for interfacing with at least two external user interface resources;

wherein the processor is configured to utilize a first external resource including a collocated computer based user interface in providing a user interface to the user for a first set of user interface functions; and the processor is configured to utilize a second external resource including a remote simultaneous voice and data connection based user interface in providing a voice user interface to the collocated user for a second set of user interface functions.

9. The device of claim 8, wherein the device comprises a printer.

10. The device of claim 8, wherein the device includes a cryptographic coprocessor.

11. The device of claim 8, wherein the second set of user interface functions comprise functions for controlling the remote device.

12. The device of claim 8, wherein the at least one external connection includes a USB device.

13. The device of claim 8, wherein the at least one external connection comprises at least two external connections wherein a first external connection is connected to the first external user interface resource and a second external connection is connected to the second external user interface resource.

14. The device of claim 8, wherein the second external resource includes an intermediary device configured to provide simultaneous voice and data connection to a remote data center.

15. A method of using a processing device having a distributed user interface including a limited internal user interface, a first external user interface including a collocated computer with a robust interface and a second external user interface including a distributed voice user interface to a user collocated with the processing device comprising:

utilizing the first external user interface to perform a first user interface function; and utilizing the second external user interface and the limited internal user interface to perform a second user interface function using a distributed voice based user interface.

16. The method of claim 15, wherein the second user interface function is configured to provide voice user interface control to the collocated user.

17. The method of claim 15, wherein the first user interface function includes performing a device initialization to setup the processing device and facilitate use of the second user interface.

18. The method of claim 15, wherein the second user interface function includes placing a secure order.

19. The method of claim 15, further comprising:

using the second external interface to receive error messages.

20. The method of claim 15, wherein the second user interface includes a simultaneous voice and data connection.

* * * * *